United States Patent
Shimada et al.

(10) Patent No.: US 7,010,745 B1
(45) Date of Patent: Mar. 7, 2006

(54) BORDER ELIMINATING DEVICE, BORDER ELIMINATING METHOD, AND AUTHORING DEVICE

(75) Inventors: Mitsunobu Shimada, Nara (JP); Kazuyuki Nako, Kyoto (JP); Katsuhiko Sato, Tenri (JP); Hideaki Tanaka, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 686 days.

(21) Appl. No.: 10/019,639

(22) PCT Filed: Jun. 27, 2000

(86) PCT No.: PCT/JP00/04192

§ 371 (c)(1),
(2), (4) Date: Dec. 28, 2001

(87) PCT Pub. No.: WO01/03416

PCT Pub. Date: Jan. 11, 2001

(30) Foreign Application Priority Data

Jul. 1, 1999 (JP) .............................. P11-188128

(51) Int. Cl.
*G06F 17/21* (2006.01)
(52) U.S. Cl. ............... 715/517; 715/521; 382/176; 382/294; 382/295
(58) Field of Classification Search .................. None
See application file for complete search history.

(56) References Cited

U.S. PATENT DOCUMENTS

| 5,483,606 | A | * | 1/1996 | Denber ...................... 382/294 |
| 5,719,968 | A | * | 2/1998 | Hashimoto et al. ......... 382/289 |
| 5,970,183 | A |   | 10/1999 | Amemiya et al. |
| 6,043,823 | A | * | 3/2000 | Kodaira et al. ............. 345/619 |
| 6,456,732 | B1 | * | 9/2002 | Kimbell et al. ............. 715/521 |
| 6,836,568 | B1 | * | 12/2004 | Morishita ................... 382/283 |

FOREIGN PATENT DOCUMENTS

JP 63142769 6/1988

(Continued)

*Primary Examiner*—Doug Hutton
(74) *Attorney, Agent, or Firm*—David G. Conlin; David A. Tucker; Edwards Angell Palmer & Dodge LLP

(57) ABSTRACT

The image input part (3) in an authoring device (1) reads a plurality of pages of a paper publication and creates images of the pages. In the border eliminating part (9) of the authoring device (1), a common area extraction part (15) extracts the area common to all of the images of the pages. The layouts with respect to at least either text or drawings in this common area of the images resemble one another. The non common-area replacement part (19) replaces the color of the portion outside the common area of the images with the background color of the common area, so as to remove the border outside the common area of each of the images. An image output part (5) in the authoring device (1) outputs the data of the post-replacement images of all of the pages of the paper publication as the contents of an electronic publication.

12 Claims, 10 Drawing Sheets

FOREIGN PATENT DOCUMENTS

| | | |
|---|---|---|
| JP | 2264566 | 10/1990 |
| JP | 4003655 | 1/1992 |
| JP | 5048870 | 2/1993 |
| JP | 5199398 | 8/1993 |
| JP | 8-289092 | 11/1996 |
| JP | 9-37057 | 2/1997 |
| JP | 9-139835 | 5/1997 |
| JP | 9-186854 | 7/1997 |
| JP | 9-191390 | 7/1997 |
| JP | 9-261448 | 10/1997 |
| JP | 9-284491 | 10/1997 |
| JP | 10-178520 | 6/1998 |
| JP | 10307460 | 11/1998 |
| JP | 11-164102 | 6/1999 |

* cited by examiner

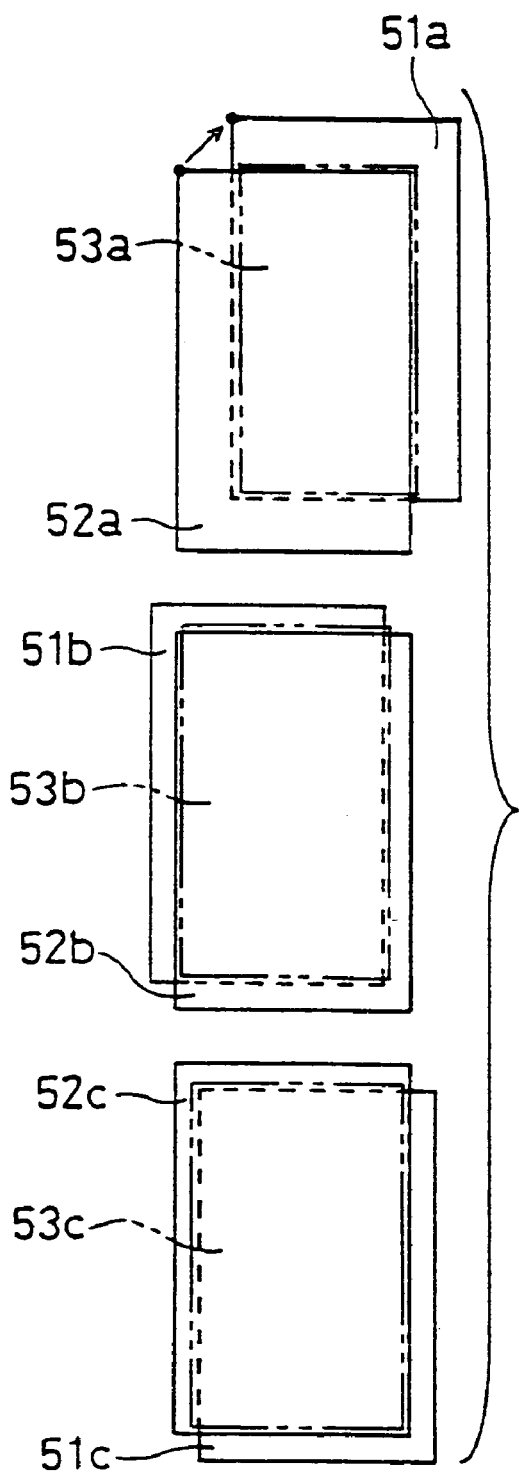
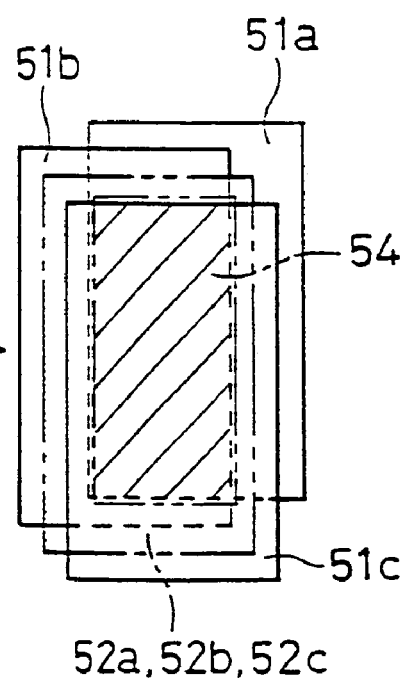

FIG. 4
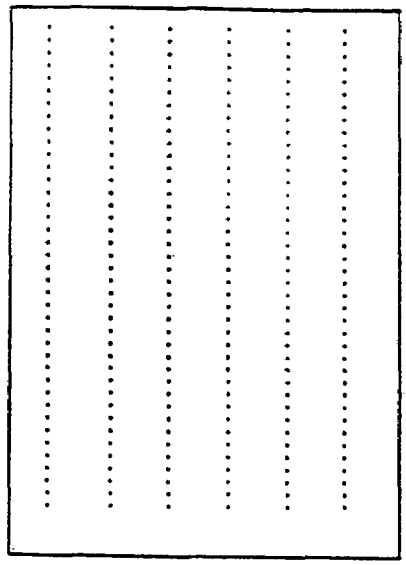
MAKE DIFFERENTIAL IMAGE ⇩
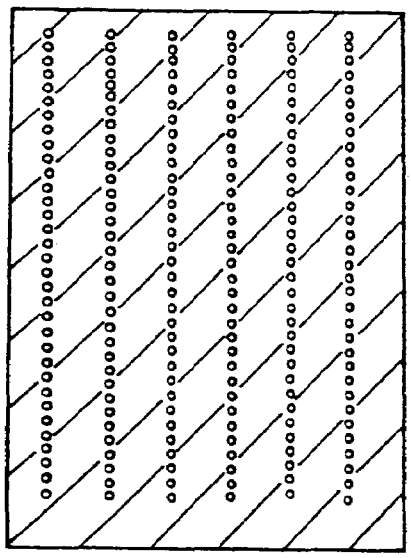
CALCULATE SUMMARY ⇩
SELECT IMAGE WHOSE SUMMARY IS MAXIMAL AS STANDARD PAGE

PAGE AREA DETECTION

TANGENT DETECTION

EDGE DETECTION

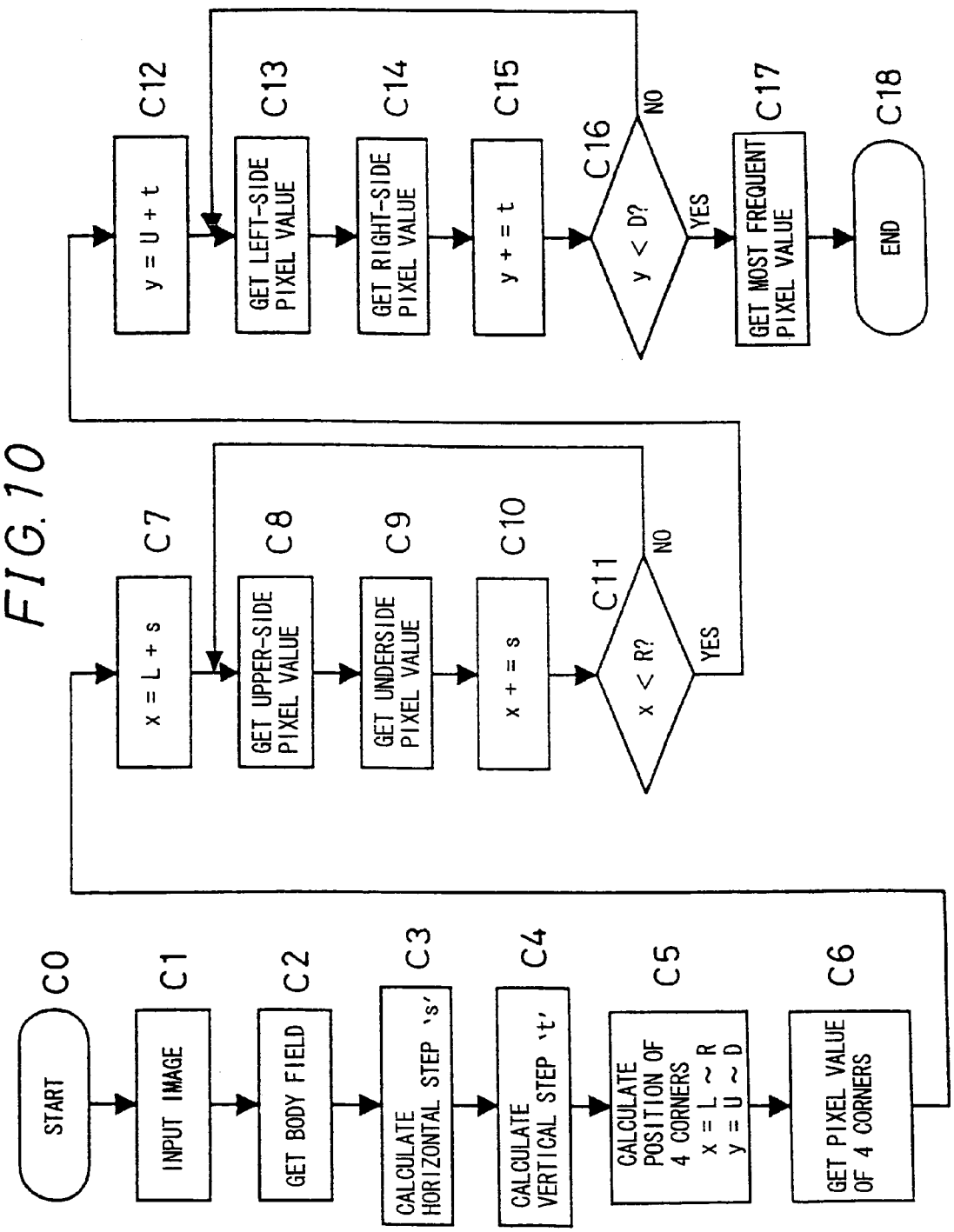

BORDER ELIMINATING DEVICE, BORDER ELIMINATING METHOD, AND AUTHORING DEVICE

TECHNICAL FIELD

The present invention relates to an authoring device for creating contents of electronic publications by inputting publications as images, and a border eliminating device and border eliminating method for use in the authoring device.

BACKGROUND ART

Recently, advancements in hardware and software have stimulated the release of electronic publications as a new form of publication replacing existing paper media. Electronic publications are publications whose contents have been turned into electronic data, and are stored in a storage medium or storage device. Electronic publications can also incorporate so-called multimedia-type data, including, for example, voice, still pictures, moving pictures, and animation. Currently, the contents, or data, of electronic publications are for the most part in a text-based format, and therefore are made up primarily of text data using character codes.

Currently, about 500,000 works are released each year as paper publications using a paper medium, that is, in the format of so-called "books." The total number of published paper publications is enormous. Of the works released as paper publications, only an extremely small number of works are released as electronic publications as well, and most works are released only in form of a paper publication.

Conventionally, when creating electronic publications of works already released as paper publications, data showing the text printed on each page of the paper publication was created either manually or using OCR (optical character recognition). Thus, creating the contents of an electronic publication required a large amount of time, so the timely release of large volumes of electronic publications to the market was difficult. Also, it is difficult to turn paper publications like comic books and photo-journals into data contents, as a most of these paper publications is made up of objects other than text, such as illustrations. In light of these circumstances, conventionally the number of electronic publications published has been about several hundred titles, which is less than the number of paper publications published. Furthermore, conventionally published electronic publications have tended to be reference materials. At the moment, the circulation of electronic publications does not even reach 1% of the circulation of paper publications. In particular, the problem of the lack of diversity in contents has become a significant obstacle in the circulation of electronic publications.

To solve the above-mentioned problems, it seems to be possible to put the contents of an electronic publication into an image-based format. Image-based contents are made from the data of images of the contents of a work. To create image data for the image-based contents of existing paper publications, it is sufficient to read in each page of the existing paper publication with by a scanner. Thus, a large number of electronic publications can be supplied to the market in a short period of time. When the contents are put into an image-based format, it is possible to release those titles that were difficult to process as text-based contents, such as comic books and photo-journals, to the market as electronic publications. When the contents are put into an image-based format, text that includes characters that do not match current character code systems, such as those using foreign characters or variant Chinese characters, or old manuscripts, for example, can be easily turned into electronic contents. When the contents are put into an image-based format, the overseas expansion and circulation of viewers and authoring systems for electronic publications is easy, because the electronic contents do not depend on language or character code. Thus, image-based contents solve all the problems associated with text-based contents.

A variety of processes are performed when creating image-based contents from paper publications, including reading in each page of a paper publication with a scanner equipped with an ADF (auto document feeder), and processing the image data obtained by the scanner into a manuscript structure. An outer border occurs at the edge of the page in the image obtained by reading in the page. The outer border within the image stands out, and gives an unpleasant feeling to the reader. When the image is displayed in a viewer equipped with a CRT (cathode ray tube) or a liquid crystal display device, the edge portion of the CRT or the liquid crystal display device forms a reference line when viewed, so the outer border within the image gives further discomfort to the reader. Based on these reasons, when creating the image-based contents of a paper publication, corrections must be performed to eliminate the outer border from the image of each page. Manually performing the corrections for erasing outer borders requires a significant amount of work, and thus increases the time required in creating electronic contents.

Japanese Unexamined Patent Publication JP-A 5-199398 (1993) discloses an image processing device for erasing outer borders when printing using a storage device for the negative-positive reversal of microfilm with negative images. The image processing device scans portions of the microfilm with negative images, and based on the image signal obtained from the results of that scan, the border between the negative image and the portion around the negative image is detected, and the portion within the image signal outside the detected border is converted to a predetermined value.

The image processing device of JP-A 5-199398 presupposes that images will be processed one at a time. To create electronic contents, the border of a large number of images must be erased, so if the process for erasing the border of each image were to be performed individually, there would be a large increase in the time required for erasing the borders of all the images. Thus, a border eliminating process using the image processing device disclosed in JP-A 5-199398 is not suited for border eliminating when creating electronic contents.

The large number of data processed images that make up the electronic contents have a regular arrangement of characters and illustrations. Thus, if the borders of a large number of images are erased individually, then the part within the image that is to have its border erased shifts depending on the image. Therefore, after individually erasing the borders of a large number of images that make up the electronic contents, it becomes unpleasant to look at the images when these numerous images are viewed in succession. For these reasons, when creating electronic contents from paper publications it is difficult to individually erase the borders of a large number of images.

An object of the present invention is to provide a border eliminating device and method, wherein unnecessary outer borders can be accurately removed from the images of a plurality of pages of a paper publication, and an authoring device which uses this border eliminating device.

DISCLOSURE OF THE INVENTION

The invention is a border eliminating device comprising common area extraction means for extracting from images of a plurality of pages of a publication an area common to the images, the common area being portions similar in layout of the images; and border removal means for removing borders outside the common area of the images, wherein layouts with respect to at least either text or drawings in the common area of the images are similar to each other.

According to the invention, the border eliminating device uses the common area, which is common in layout to all of the images to be processed, to remove outer borders in the images. Thus, the border eliminating device can efficiently remove unnecessary outer borders from a plurality of images.

The border eliminating device of the invention further comprises justification means for justifying images so that the common area in the images is arranged at a predetermined position within the images, wherein the common area extraction means and the border removal means perform processes with respect to all post-justification images.

According to the invention, the border eliminating device performs a border eliminating process, using the common area, on the images which have been justified to one another. Thus, the border eliminating device can remove outer borders without shifting, among the plurality of images, the position of the portion subjected to border elimination within the images. Therefore, when there are regularities in the layout of the text and the drawings in all images to be processed, the border eliminating device can prevent the images that have been subjected to border elimination from being unpleasant to look at when viewed one after the other.

The border eliminating device of the invention further comprises justification means for justifying images so that the common area in the images is arranged at a predetermined position within the images, wherein the common area extraction means:

(a) for each page of a publication, determines from justified images a region in which there is overlap between a post-justification image and a pre-justification image when they are superimposed on one another such that a coordinate system origin is shifted for an amount of displacement when they are aligned, and coordinate axes of both images become parallel; and (b) extracts as the common area an overlapping portion in the region of the images, when all post-justification images are overlapped with their coordinate systems matching one another.

According to the invention, in the border eliminating device, the common area extraction means extracts the common area in accordance with the overlap of all the pre- and post-justification images. Thus, complex image processing to eliminate borders in all the images is unnecessary, so the border eliminating device can more rapidly remove the outer border from the images.

In the border eliminating device of the invention, the common area extraction means:

(a) selects from all the images an image to be a standard for eliminating borders;

(b) extracts a common area from the selected image; and (c) extracts from the remaining images a region that is at the same position as the position of the common area of the selected image and that is congruent with the common area of the selected image, as a common area of the remaining images.

According to the invention, in the border eliminating device, the common area extraction means extracts the common area of the remaining images based on the position and shape of the common area in the image selected from all the images. Thus, only the common area of the single selected image is extracted by image processing, so the border eliminating device can quickly remove outer borders from the images. Furthermore, if the common area of the single selected image is extracted by image processing, then the border eliminating device can accurately remove outer borders from the images.

In the border eliminating device of the invention, the common area extraction means selects from all the images an image having a largest number of edges as an image serving as a standard for border elimination.

In the border eliminating device according to the invention, the common area extraction means uses, of all images that are to be processed, the image having a largest number of edges therein, as the standard for border elimination. The more level the saturation changes are in the image, the easier it is to make a mistake when extracting the common area, because the common area of an image becomes difficult to determine. The common area can be most reliably extracted when the image having the largest number of edges of all the images is used as the standard for border elimination.

In the border eliminating device of the invention, the common area extraction means independently performs the extraction of a common area of images of all right-side pages of a publication and the extraction of a common area of images of all left-side pages of the publication.

According to the border eliminating device of the invention, the common area extraction means divides all the images to be processed into the images of right-side pages of a publication and the images of left-side pages of the publication, and then separately extracts common areas for those images. Thus, when the configuration of the right and left-side pages is different, borders can be more accurately erased.

The border eliminating device of the invention further comprises background color calculation means for determining a background color of the common area of the images, wherein the border removal means replaces a color of a portion outside the common area of the images with the detected background color.

According to the border eliminating device of the invention, the border removal means replaces the color of the portion outside the common area with the background color of the common area. Thus, the border eliminating device can naturally remove outer borders in accordance with the background color of the common area.

In the border eliminating device of the invention, the background color calculation means:

(a) extracts a plurality of samples from a peripheral portion inside the common area of the images; and (b) sets a color of a most frequent value among the plurality of extracted samples as the background color.

According to the border eliminating device of the invention, the background color calculation means detects a background color based on samples extracted from the peripheral portion inside the border of the common area of the images. Thus, because the background color is detected easily, the border eliminating device can more rapidly remove outer borders from the images.

In the border eliminating device of the invention, the samples are pixel values of pixels in the peripheral portion inside the common area of the images.

According to the border eliminating device of the invention, the background color calculation means uses the pixel values of pixels in the peripheral portion within the contour of the common area of the images as the samples. Because the samples are pixel values, the calculations for detecting the background color are extremely simple, and thus the border eliminating device can more rapidly remove outer borders in the images.

In the border eliminating device of the invention, the samples are average values of the pixel values of all pixels included in regions of a predetermined size provided in the peripheral portion inside the common area of the images.

According to the border eliminating device of the invention, the background color calculation means uses average values of the pixel values of all pixels included in regions of a predetermined size provided in the peripheral portion inside the contour of the common area of the images as the sample. Because the samples are the average values of the pixel values of all pixels in the regions, when the background of an image has a periodic pattern, the outer borders in the image can be removed more naturally.

The invention is a border eliminating method, comprising:
- a step of extracting from images of a plurality of pages of a publication an area common to the images, the common area being portions similar in layout of the images; and
- a step of removing borders outside the common area of the image from each image,
- wherein layouts with respect to at least either text or drawings in the common area of the images are similar to each other.

According to the invention, in the border eliminating method, the common area which is common to all images to be processed is used to remove outer borders from the images. Thus, when this border eliminating method is used, unnecessary outer borders can be effectively removed from a plurality of images. The border eliminating method of the invention can further include the steps for performing the processes explained above with regard to the border eliminating device of the invention.

The invention is an authoring device, comprising:
- image input means for inputting images of pages of a publication;
- the border eliminating device as described above; and
- image output means for outputting images of pages processed by the border eliminating device.

According to the invention, the authoring device uses one of the above-described border eliminating devices of the invention to remove outer borders in images of all pages of a publication. Thus, the authoring device, when creating the image-based contents of an electronic publication based on a publication that uses a paper medium, can efficiently and rapidly remove the outer borders in the images of the pages. Thus, numerous types of electronic publications based on publications using a paper medium can be quickly supplied to the market.

BRIEF DESCRIPTION OF THE DRAWINGS

Other and further objects, features, and advantages of the invention will be more explicit from the following detailed description taken with reference to the drawings wherein:

FIGS. 3A and 3B are schematic drawings illustrating a first process for extracting from images of a plurality of pages of a publication an area common to the images;

FIG. 4 is a schematic drawing illustrating a method for selecting a standard image, in a second process for extracting from images of a plurality of pages of a publication an area common to the images;

FIG. 10 is a flowchart illustrating the background color calculation process of the background color calculation part 17 in the border eliminating part 9 of FIG. 1.

BEST MODE FOR CARRYING OUT THE INVENTION

The following is a description, with reference to the accompanying drawings, of the preferred embodiments of a border eliminating device, border eliminating method, and authoring device according to the invention.

Figure 1:
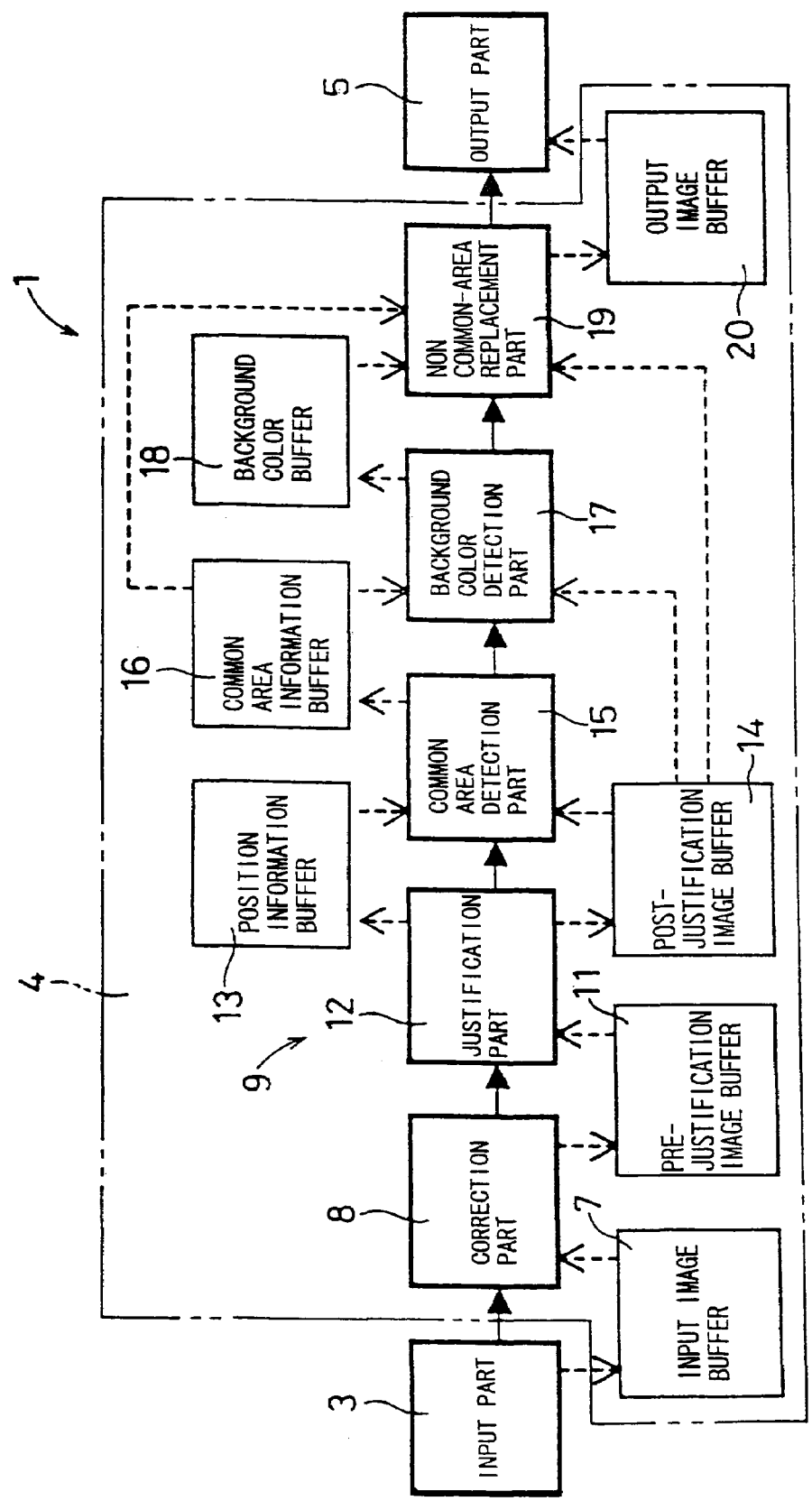
FIG. 1 is a functional block diagram of an authoring device 1 including a border eliminating part 9 according to an embodiment of the invention.

FIG. 1 is a functional block diagram of an authoring device 1 including a border eliminating device according to an embodiment of the invention. The authoring device 1 includes an image input part 3, an image processing part 4, and an image output part 5. The image processing part 4 includes an input image buffer 7, an image correction part 8, and a border eliminating part 9, which is the border eliminating device of the invention. The border eliminating part 9 includes a pre-justification image buffer 11, a justification part 12, a position information buffer 13, a post-justification image buffer 14, a common area extraction part 15, a common area information buffer 16, a background color calculation part 17, a background color buffer 18, a non common-area replacement part 19, and an output image buffer 20.

The authoring device 1 is for creating the image-based contents of electronic publications based on paper publications, that is, publications using a paper medium. Image-based contents are made up of the data of images showing the contents of the publication. Apart from image data, the image-based contents can include auxiliary data on text formats using character codes, for example. Images are made up of a plurality of pixels arranged in a matrix. Image data include a pixel value for each of the plurality of pixels. When the image is monochrome, the pixel value of the pixels is a numerical value indicating the saturation of the pixels. When the image is colored, the pixel value of the pixels is made up of a combination of numerical values, and showing the brightness, color, and hue of the pixels. In this specification, "color" is a concept that also includes white and black. The authoring device 1 always handles images as data, so in the present specification, "image" includes the concept of "image data."

An outline of the operations of the authoring device 1 is as follows. The image input part 3 reads out each of a plurality of pages of a publication, and generates images for each page. The generated images of the pages are stored in the input image buffer 7. The image correction part 8 performs an image correction process on the images stored in the input image buffer 7. The corrected image for each page, or in other words, the images of the pages before being justified, are stored in the pre-justification image buffer 11.

The justification part 12 performs a process for aligning the images stored in the pre-justification image buffer 11 and creates post-justification images. The position for the post-justification images with respect to the coordinate system origin of the common area, which is explained later, is the position stipulated by a predetermined template. The position information indicating the results of the justification of the images is stored in the position information buffer 13. The post-justification images of the pages are stored in the post-justification image buffer 14.

The common area extraction part 15, the background color calculation part 17, and the non common-area replacement part 19 are for performing a process to remove outer borders from the images of the pages of the publication. In the example in FIG. 1, the common area extraction part 15, the background color calculation part 17, and the non common-area replacement part 19 use the post-justification images of the pages as the images of the pages of the publication to be processed.

The common area extraction part 15 extracts a common area, which is an area shared by the images of a plurality of pages of the publication, from the images of the pages of the publication, based on the plurality of post-justification images stored in the post-justification image buffer 14. In comparison of the layouts with respect to at least either text or drawings in the common area of the images with each other, the layouts of the common area in the images are similar to each other. For example, the arrangements of the outer rectangles of at least either text or drawings in the common areas resemble one another when comparing the page images with each other. The common area information indicating the results of the extraction of the common area of the images is stored in the common area information buffer 16.

Based on the post-justification images stored in the post-justification image buffer 14, the background color calculation part 17 determines the background color of the common area of the images. The background color of the common area of the images is stored in the background color buffer 18. The non common-area replacement part 19 corresponds to a border removal part for removing the border outside the common area of the image of each page of the publication. The non common-area replacement part 19 replaces the color of the portion outside the common area of the post-justification images stored in the post-justification image buffer 14 with the background color that has been detected. The images after this replacement process are stored in the output image buffer 20.

The image output part 5 outputs all the post-replacement images of pages stored in the output image buffer 20. The image-based contents of an electronic publication are made up of the post-replacement images of all the pages of the publication.

Thus, the border eliminating part 9 in the authoring device 1 uses the common area common to all of the images to be processed so as to remove the outer border in the images. That is, the border eliminating part 9 can efficiently remove unnecessary outer borders from a plurality of images. Therefore, with the authoring device 1, numerous and various types of electronic publications based on paper publications can be supplied to the market in a short period of time.

The border eliminating part 9 uses the common areas to perform a border eliminating process on images that have undergone justification among images, that is, post-justification images. Thus, the border eliminating part 9 can remove outer borders without a shift between a plurality of images with respect to the location of the portion that is to have its border eliminated within the image. Consequently, when there is regularity in the layout of the text and the drawings in all the images being processed, the border eliminating part 9 can prevent the images from becoming difficult to look at when all the images are viewed in succession after the borders have been eliminated.

Figure 2:
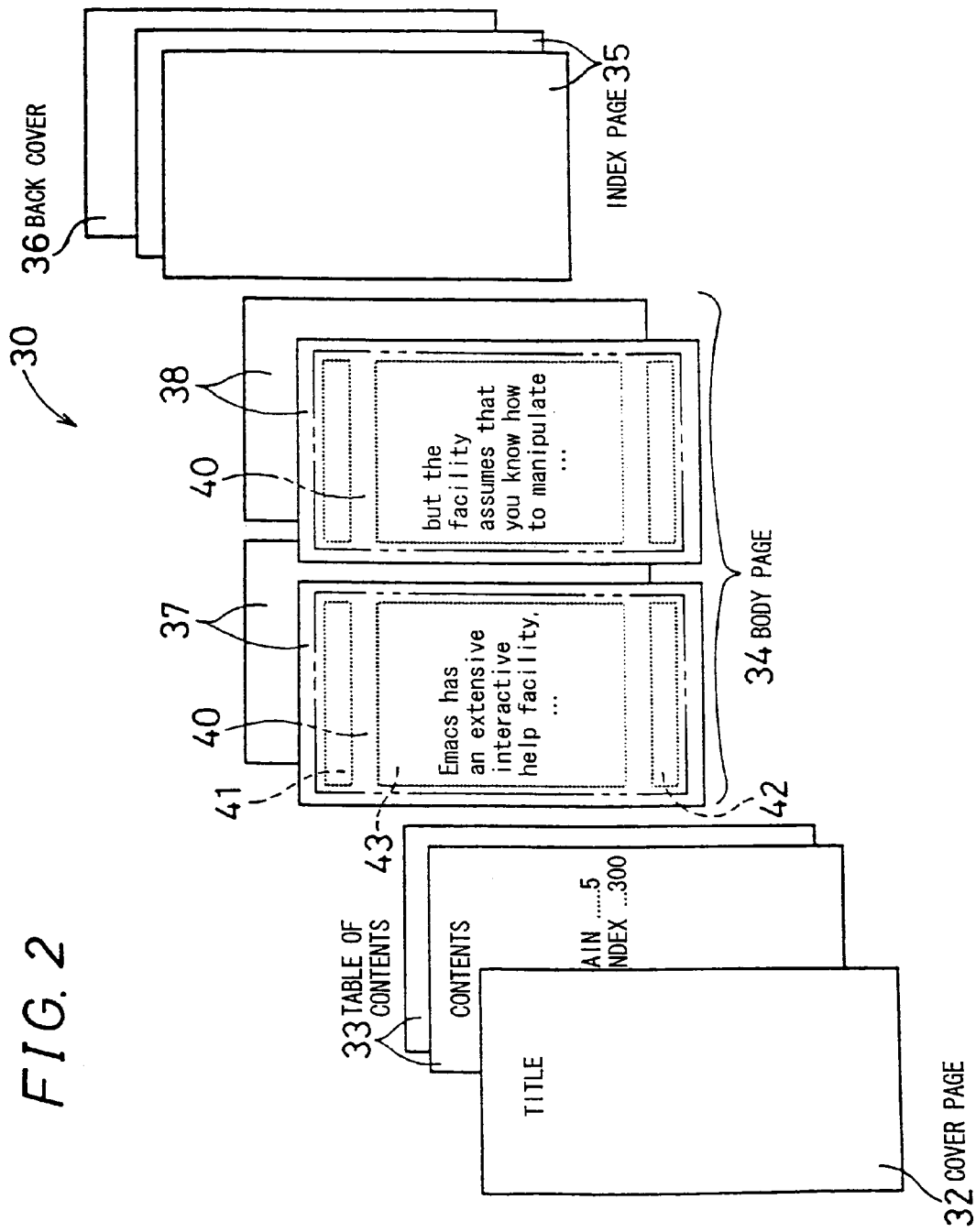
FIG. 2 is a diagram showing the configuration of a paper publication that uses a paper medium.

FIG. 2 is a schematic diagram showing the configuration of a paper publication 30 that is to be processed by the authoring device 1. In the example in FIG. 2, the paper publication 30 is a novel, and is shown with the pages of the paper publication 30 separated at each page. Two pages in the paper publication 30 are printed one page each on the front and back of a single sheet of paper, but in FIG. 2 these two pages are shown separately. The paper publication 30 includes a cover page 32, a table of contents 33, body pages 34, an index page 35, and a back cover 36. The cover page 32 is provided at the beginning of all pages of the paper publication 30, and shows the title of the paper publication 30. The table of contents 33 lists the contents of the paper publication 30. The body pages 34 show the body of the text of the paper publication 30. The index page 35 lists the index of the paper publication 30. The back cover 36 is provided after all other pages of the paper publication 30. The body pages 34 are divided into odd numbered pages 37 arranged at odd number pages counting from the cover page 32 at the beginning of the paper publication 30, and even numbered pages 38 arranged at even number pages counting from the cover page 32 of the paper publication 30.

Most pages of the paper publication 30 are body pages 34. The plurality of body pages 34 each has a text region 40. The positions of the text regions 40 in each of the numerous body pages 34 are substantially equivalent to one another. Each text region 40 of the body pages can be divided into a header region 41, a footer region 42, and a body content region 43. In the case of a novel, the page number is written in the header region 41, the chapter number of the body content is written in the footer region 42, and a portion of the body content, that is, the text, is shown in the body content region 43.

Each page in the publication basically has the same configuration. "Configuration of the pages of the publication" means the layout of at least either text or drawings included in the pages, that is, the alignment of the text and the drawings in the pages with respect to the outside rectangular page contours. For example, the layout of the text and the drawings making up the text in the body content regions 43 of the plurality of body pages 34 is essentially identical. The layout of the text and the drawings in the header regions 41 and footer regions 42 of the plurality of odd numbered pages 37 is substantially the same, and the layout of the text and the drawings in the header regions 41 and footer regions 42 of the plurality of even numbered pages 38 is substantially the same. The border eliminating part 9 of this embodiment uses these characteristics of the configuration of paper publications to erase the outer border that occurs within the image of each page.

In the subsequent explanations, the region in the image of a page on which the body content region 43 is printed is used as the common area within the page images. When the configuration of the header region 41 of the images of the odd numbered pages 37 resembles the configuration of the header region 41 of the even numbered pages 38, the common area can include the header region 41 in addition to the body content region 43. When the configuration of the footer region 42 of the images of the odd numbered pages 37 resembles the configuration of the footer region 42 of the even numbered pages 38, the common area can include the footer region 42 in addition to the text region 43.

Once again referring to FIG. 1, a detailed explanation will be given of the configuration of the processing parts of the authoring device 1.

The image input part 3 can be a scanner device controlled with scanner control software, for example. The scanner device includes a placement plate and a photographic portion. The original text that is to become the image to be input into the authoring device 1, for example the pages of a paper publication, is placed on the placement plate. The photographic portion captures the image of the page placed on the placement plate. To capture an image, for example, the photographic portion more specifically scans a predetermined input region of the placement plate and the surface of an object placed within the input region, and from the results of the scan, data for the image appearing inside the input region is created. It is also possible that the photographic portion photographs the input region instead of scanning it. The captured image can be a monochrome image or a color image. The captured image can be a two-value image with two levels of pixel values, or a multi-value image with three or more levels of pixel values. It is also possible to omit the placement plate.

When capturing images of the pages of a paper publication in the image input part 3, every page of the paper publication is separated page by page and then placed on the placement plate one at a time, so that an image of each of the pages is captured. An automatic document feeder can be used to automatically supply all of the separated pages onto the placement plate. When the pages of a paper publication cannot be removed at each page, it is also possible to place the entire publication onto the placement plate without cutting out the pages, so as to scan each page into the photographic portion one at a time. When an automatic document feeder is used, it is conceivable that the centerline of the placed page is tilted, when viewed from the centerline of the input region. In this case it is preferable that the size of the input region is larger than the pages of the publication so that the entire page is accurately scanned.

When the pages of the publication are larger than the input region of the scanner device, the image input part 3 divides one page into a plurality of portions, captures an image of each of these portions, and obtains an image of the entire page by synthesizing the images of all portions. Synthesizing all images of the portions can be done for example within the input image buffer 7, performed by an image synthesis portion provided in the image input part 3 or the image processing part 4, or performed by an image synthesis part furnished in the scanner device as either hardware or software. It should be noted that in place of a scanner device, the image input part 3 can also be realized by a device which reads the images of pages of a publication already existing as data files and stores them in the input image buffer 7. This device for reading images can be realized by a device for reading out data from a storage medium, for example.

As explained above, when the input region of the scanner device is larger than the pages of a publication, or portions of a divided page, the image of the page that is obtained by the scanner device is larger than the page region, that is, the region on which the pages of the publication are printed within the image of the page. These page images are divided into a page region and a blank region, that is, the remaining region excluding the page region. The following explains an example in which the image of the page is larger than the page region. When the image of the page is larger than the page region, the edge of the page is captured in the image of the page as the outer border. The border eliminating part 9 of the present embodiment erases the outer border corresponding to the edge of the page from the image of the page.

The image correction part 8 carries out various corrections with respect to a plurality of images in the input image buffer 7. One of these corrections is a process for correcting bends and tilting occurring, for example, in the image when the image input part 3 captures the images. Another correction process is for removing the printing of the reverse side of the page from the images. Publicly known technologies are used for the correction processes of the image correction part 8.

The justification part 12 uses the relationship between the positions of the common area of the plurality of images in the pre-justification image buffer 11 to justify the common area, and based on the results of this justification, transforms the coordinates of the images. The justification part 12 creates post-justification images based on the images after the coordinate transformation, and stores them in the post-justification image buffer 14. The post-justification images are made by erasing pixels whose transformed coordinates are outside the region specified by the transformed coordinates, for example, in which only pixels in the first quadrant of the coordinate system are left behind, from all the pixels of an image after the coordinate transformation, and by adding pixels to defective area slacking pixels within this region. The added pixels can be white pixels, or can be pixels of the same color as the background color determined by the background color calculation part 17, which is explained later. The result of this justification is that the position of the post-justification image with respect to the coordinate axes of the portion that includes the common area of the page is substantially equivalent among post-justification images.

The justification part 12 stores the position information of the images of pages in the position information buffer 13. The position information of the image of any page is the amount of displacement from the position of the common area of that image before and after justification. The amount of displacement is the vector made by combining the shift in a direction parallel to one axis of the coordinate system, and the shift in a direction parallel to the other axis of the coordinate system. As long the position information of the image of any page is information indicating the positional relationship between the image of that page before justification and the image of that page after justification, it is not limited to the amount of displacement, and can also include other information. For example, if the image before justification and the image after justification are superimposed on one another shifting the coordinate system origin for the amount of displacement, then the position information can also be the information indicating the overlapping portion. Information indicating this overlapping portion can include the vertices of that portion or a plurality of coordinates on the contour of that portion, for example, and the coordinates can be coordinates of the coordinate system of the image before justification, or coordinates of the image after justification.

The common area extraction part 15 extracts the common area from a plurality of post-justification images of pages. The images from which the common area is extracted are after justification images, so that the positions of their common areas with respect to the coordinate system origin of the images of the pages are equivalent to one another, and the common areas within the images of the pages are congruent. There are two methods for the extraction of common areas, either of which may be used.

A first common area extraction process is outlined below. First, as shown in FIG. 3A, at each page of the publication, a region of overlap 53 (hereinafter, called the "overlapping region") between the images 51 and 52 is extracted from the post-justification image 52, when the pre-justification image 51 and the post-justification image 52 are shifted from the origin of the system of coordinates for the amount of displacement detected by the justification part 12, and placed on one another such that their coordinate axes become parallel. Next, as shown in FIG. 3B, the overlapping portions in the overlapping region 53 of the post-justification images 52 when all post-justification images 52 are overlapped with one another such that their coordinate system origin and coordinate axes are matching, is extracted as a common area 54. In the example of FIG. 3, there are three pages of a publication, so reference numerals "a" to "c" relating to the first through third pages have been added. It should be noted that in FIG. 3B, oblique lines mark the common area 54.

A second common area extraction process is outlined as follows. First, a single image serving as the standard for border elimination is selected from among all images. The selected image preferably has the largest number of image edges among all the images. Next, a common area is extracted from the selected image. Finally, from the remaining images, regions that are congruent with the common area of the selected image and are in a position equivalent to the position of the common area within the selected image are extracted as the common areas of the remaining images.

As shown in FIG. 4, to select the image having the largest number of image edges from among all the images, first the sum of the first derivatives of the saturation value of all pixels making up the image is determined for each image, then the image with the largest sum of first derivatives should be chosen as the standard image for border elimination. The reason why the standard image for eliminating borders is the image having the largest number of edges is because of the following. When a common area is extracted by image processing, the less edge an image has, the more likely mistakes are going to occur in extracting the common area within the image. When the image having the largest number of edges is taken as the standard image, the extracted common area is of the highest precision, so the common area of all images can be reliably extracted.

The background color calculation part 17 specifically extracts a plurality of samples from the peripheral portion inside the contour of the common area of the images, and stores the color of the most frequent value among the plurality of the extracted samples in the background color buffer 18 as the background color. Using samples to detect the background color in this manner, the background color can be easily detected, so the border eliminating part 9 can more rapidly erase the outer border within the images.

Figure 5:
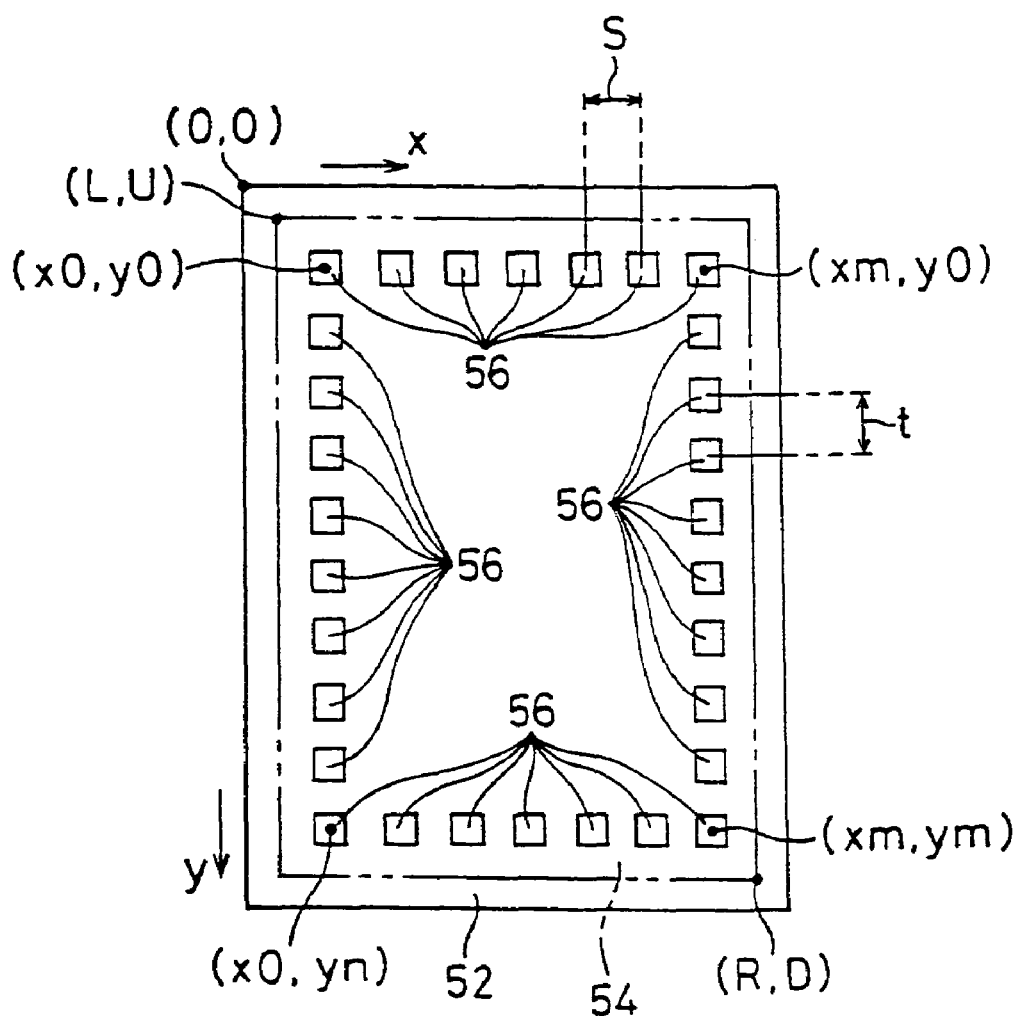
FIG. 5 is a diagram illustrating the sample points and sample regions for obtaining samples in a process for determining the background color of images of pages of a publication.

The samples are preferably the pixel values of single pixels in the peripheral portion within the common area 54 of the images. Thus, it becomes easy to make calculations for detecting the background color, so the border eliminating part 9 can more rapidly remove the outer border within the images. Alternatively, as shown in FIG. 5, the samples are preferably the average values of the pixel values of all pixels included within regions 56 (hereinafter, called "sample regions") of a predetermined size and provided at a peripheral portion within the common area 54 of the images. Consequently, the border eliminating part 9 can more naturally remove the outer border within an image when the background of the image has a periodic pattern.

The non common-area replacement part 19 more specifically reads out the post-justification images stored in the post-justification image buffer 14, and replaces the pixel value of all the pixels constituting the portion outside the common area of the images with the value corresponding to the background color stored in the background color buffer 18. Consequently, the outer border of the images is removed. In this way, the non common-area replacement part 19 replaces the color of the portion outside the common area with the background color of the common area. Thus, the border eliminating part 9 can make the portion outside the common area after the outer border has been removed appear natural in accordance with the background color of the common area. The images after this replacement are stored in the output image buffer 20.

The image output part 5 can be realized by a device for writing data to a storage medium, for example. The image output part 5 writes the post-replacement images of all pages stored in the output image buffer 20 onto a storage medium, thereby completing the contents of an electronic publication. It is also possible that, instead of a storage medium, the image output part 5 writes all post-replacement images of the pages onto a memory device or an external storage device. The image input part 5 can also be a display device that visually displays the post-replacement images of all the pages in order or side by side.

The following is an example of the justification process of the justification part 12. The justification process includes extracting the page region from the image of a page, extracting the page content region from the extracted page region, justifying the page content region, and transforming the coordinates of the image of the page. The page content region is where text or drawings, or both, are actually printed within the page region. This means that the page content region is the area in the page image where the body region of the page is printed. When the image correction part 8 has not performed a correction of the tilting of the justified images, any tilting of the page content region is corrected before the post-justification image is created. It should be noted that the following example of the justification process is a case in which the image justification part 8 has not corrected the tilting of the image.

Figure 6A:
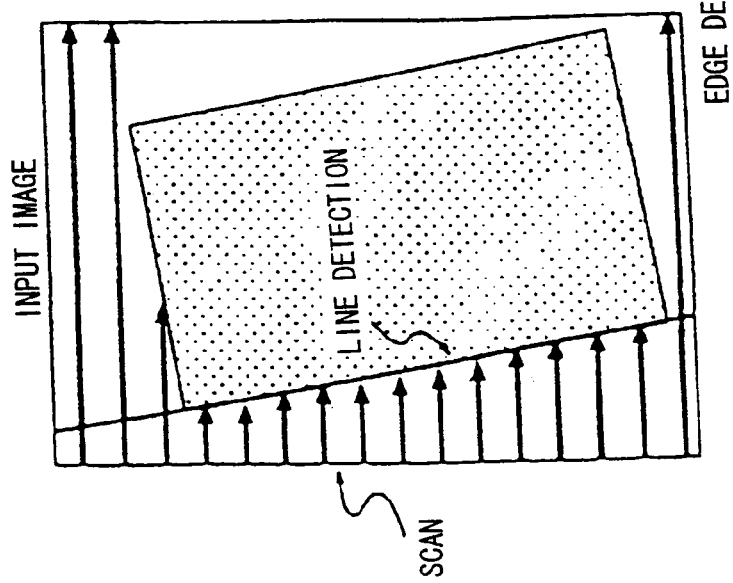
FIGS. 6A to 6C are schematic diagrams illustrating the method for extracting page regions, which are the regions on which the page itself is printed, from the images of pages, in a process for justifying the images of pages of a publication.
Figure 6B:
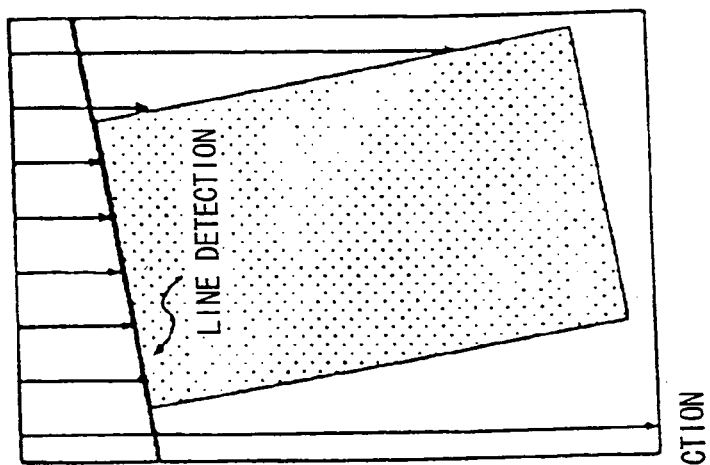
Figure 6C:
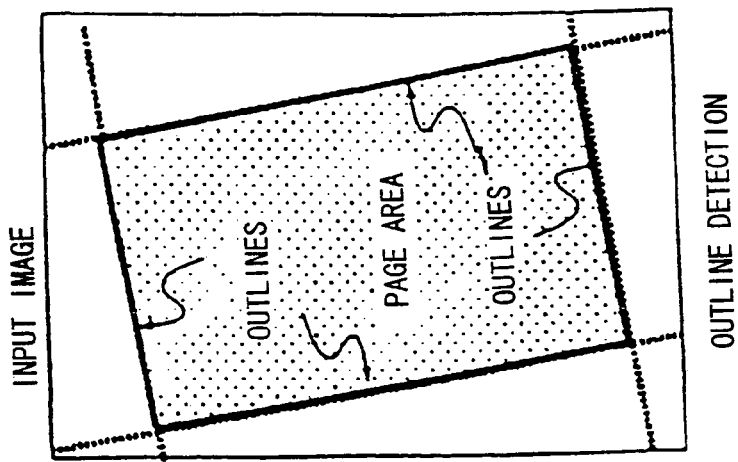

The process for extracting the page region will be explained in detail with reference to FIG. 6. FIGS. 6A to 6C are pre-justification images from which the page region is to be extracted.

First, four line segments in the image at positions closest to the four edges of the image, for example the line segments that are in contact with the four edges of the outer border within the image, are detected in order. FIG. 6A shows how the line segment on the left-most side of the page region are detected. To detect the line segments on the left-most side of the page region, first the edge points closest to the left edge of the image are detected at each of a plurality of lines within the image that is being processed. One line of an image is made up of a plurality of pixels lined up horizontally. To detect an edge point in a line, first the first derivative of the pixel values of all the pixels is taken in the direction perpendicular to the line segment that is to be detected. In the example of FIG. 6A, this is the horizontal first derivative. A Sobel filter, for example, can be used for calculating the first derivative. Next, sequentially from the pixels at the left end to the pixels at the right end making up each line, the pixel are assessed one by one, based on the first derivative of the pixel values, whether they are an edge point or not. When it is determined that the pixel being assessed is not an edge point, the pixel next to it is then assessed. When it is determined that the pixel is an edge point, then its coordinates are stored and scanning of that line ends. If this line scanning is performed on all lines of the image, then the coordinates of the edge point furthest to the left in all the lines can be obtained. The obtained edge points should all lie on one line segment, so that line segment is then determined as the line segment on the left-most side of the page region. To calculate the line segment, it is possible to use a Hough transformation, for example.

Then, using the same procedure as that for detecting the line segment on the left-most side of the page region, the line segments at the top-most, right-most, and bottom-most sides of the page region are detected one by one. FIG. 6B shows how the line segment at the top-most side of the page region is detected. After the four line segments have been detected, the rectangular region surrounded by the four detected line segments is extracted as the page region from the image being processed, as shown in FIG. 6C.

Figure 7C:
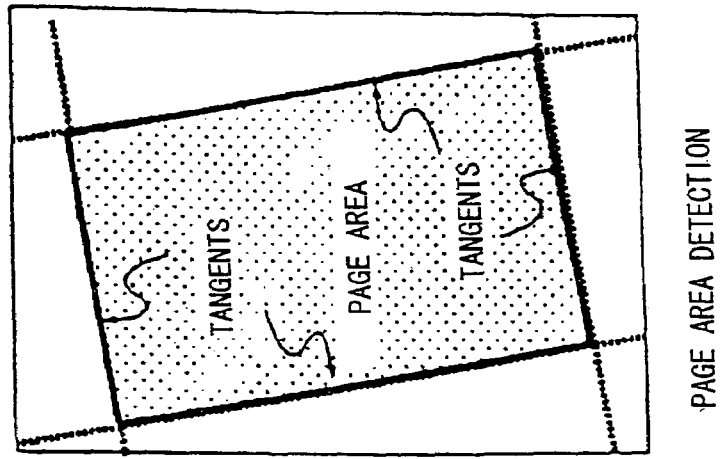
FIGS. 7A to 7C are schematic diagrams illustrating the method for extracting page content regions, which are the regions including characters or the like, from the page region of images of pages, in a process for justifying the images of pages of a publication.
Figure 7B:
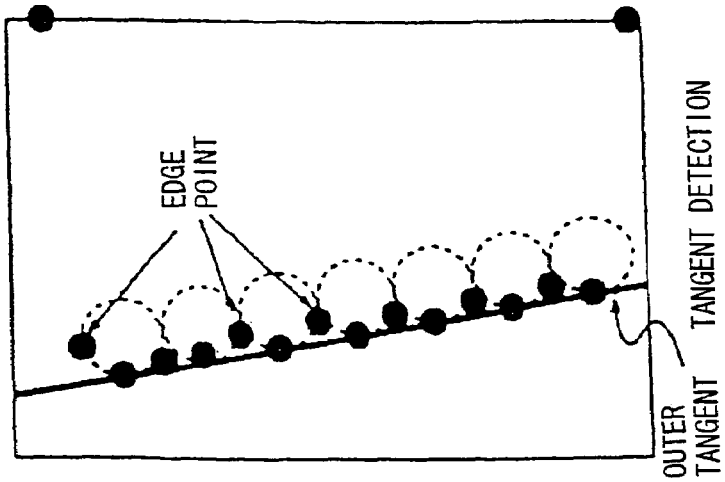
Figure 7A:
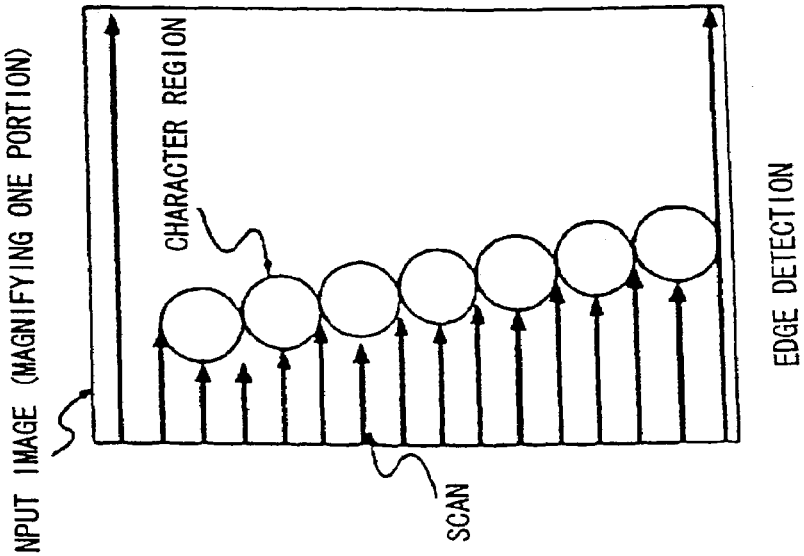

The process for extracting the page content region will be described in detail with reference to FIG. 7. FIGS. 7A to 7C are diagrams magnifying one portion of a pre-justification image from which the page content region is to be extracted.

First, the outer tangents of characters at positions closest to the four sides of the page region are detected. FIGS. 7A and 7B illustrate how the outer tangent of the characters at the left-most side of the page region is detected. To detect the outer tangent at the left-most side, first, as shown in FIG. 7A, the edge point closest to the left edge of the page region is detected at each of a plurality of lines within the page region. To extract the edge point at the left-most side in a line, lines within the page region without taking their first derivative are scanned in the same way as when the page region was detected. Next, as shown in FIG. 7B, the line segment that passes through two points of the edge points detected from all the lines and that is closer to the left edge of the page region than the edge points detected from all the lines is determined as the outer tangent of the left-most side.

Using the same procedure as that for detecting the outer tangent on the left-most side, the top-most, right-most and bottom-most outer tangents are detected one by one. After the four outer tangents have been detected, the rectangular region surrounded by the four detected outer tangents is extracted as the page content region from the image being processed, as shown in FIG. 7C.

After the page content region has been extracted, if the four sides of the page content region are tilted with respect to the coordinate axes of the pre-justification image, then the pre-justification image is subjected to a rotation transformation to correct the tilt in the page content region. The template defines the location of the page content region in the page image. The template can be set beforehand, or can be set in accordance with the results of the extraction of the page content region of the pre-justification images of all the pages of the publication. In the latter case, the position of the page content region in one image of all the pre-justification images can be used as the template, but it is also possible to determine the average or most frequent position, for example, of the page content region of all the pre-justification images, and to use that determined position as the template.

After the page content region has been extracted, the justification part 12 compares the position of the page content region in each image of the pages to be processed with the position of the page content region defined by the template, and takes the shift between the two positions as the position information serving as the justification results. After the pre-justification images are justified with the template, the coordinates of the image of each page are transformed based on the justification results, so that the position of the page content region with respect to the coordinate axes of the image of each page aligns with the position of the page content region with respect to the coordinate axes defined by the template. The result is that the position of the page content region with respect to the coordinate axes is shifted parallel. After this coordinate transformation, the justification part 12 produces post-justification images based on the images after coordinate transformation, and saves them in the post-justification image buffer 14. The end result of the justification process described above is that the portion in the post-justification images on which the page common area is printed becomes substantially equivalent among the post-justification images.

Figure 8:
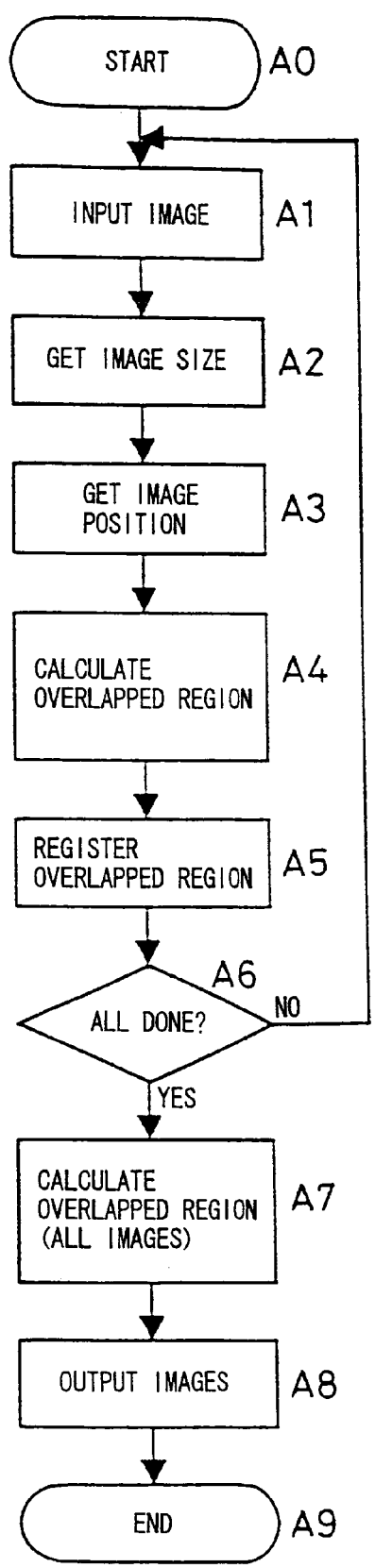
FIG. 8 is a flowchart illustrating a first common area extraction process of the common area extraction part 15 in the border eliminating part 9 of FIG. 1.

FIG. 8 is a flowchart illustrating the first common area extraction process of the common area extraction part 15. After at least one image of a page of a publication is stored in the post-justification image buffer 14, Step A0 proceeds to Step A1. In Step A1, the common area extraction part 15 retrieves one post-justification image of a page from the post-justification image buffer 14. In Step A2, the common area extraction part 15 measures the size of the retrieved image. In Step A3, the common area extraction part 15 retrieves the position information of the retrieved image from the position information buffer 13.

In Step A4, based on the retrieved position information and the measured size of the image, the common area extraction part 15 calculates the coordinates that define the areas of overlap between the post-justification image of a page and the pre-justification image of that page. The overlapping area is the portion of overlap between the post-justification image and the pre-justification image when the pre-justification image and the post-justification image have been superimposed on one another so that the coordinate system origin is shifted for the amount of displacement of the position information and the coordinate axes become parallel. In Step A5, the common area extraction part 15 stores the calculated coordinates as information that defines the region of overlap in the post-justification images that have been retrieved. The information defining the region of overlap can be stored in the common area information buffer, for example, or stored in another buffer. If the position information represents the overlapping region within the retrieved image, then the position information can be used as is.

In Step A6, the common area extraction part 15 determines whether the overlapping regions of the post-justification images of all of the pages of a publication have been calculated. If there are still post-justification images in which the overlapping region has yet to be calculated, then the procedure returns from Step A6 to Step A1, and Steps A1 to A5 are performed using the post-justification images in which the overlapping region has yet to be calculated. If the overlapping region of all the post-justification images of pages has been calculated, the procedure advances from Step A6 to Step A7.

In Step A7, based on the information of the stored overlapping region, the common area extraction part 15 calculates the coordinates which define the area of overlap between the overlapping regions of all the images when the post-justification images of all the pages of a publication have been superimposed on one another so that the coordinate system origin and the coordinate axes match one another. In Step A8, the common area extraction part 15 stores the coordinates defining the portion of overlap between the overlapping regions into the common area information buffer 16 as the information which defines the common area in the post-justification images of all of the pages. After the common area information has been stored, the flowchart ends at Step A9. As described above, the common area extraction part 15 extracts the common area based on the state of overlap between all of images before and after justification. Thus, as there is no need to perform complex image processing in order to erase the borders in all the images, the border eliminating part 9 can more rapidly remove the outer border in the images.

In the example of FIG. 8, the common area extraction part 15 reads out a post-justification image from the post-justification image buffer 14 to measure the size of a post-justification image. It is also possible to measure the size of a post-justification image when it is being justified by the justification part 12 and store this size in the position information buffer 13. In this case, the common area extraction part 15 omits the reading out of the post-justification images and measuring of their size, and when reading out position information, it reads out the size of post-justification images from the position information buffer 13. Thus, the process of extracting the common area becomes even simpler.

Figure 9:
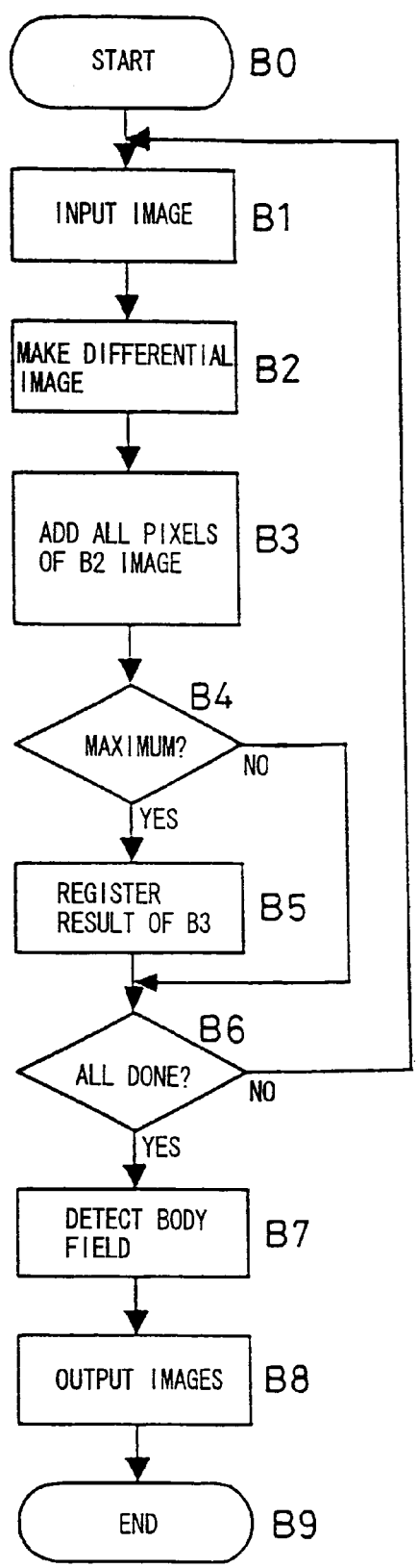
FIG. 9 is a flowchart illustrating a second common area extraction process of the common area extraction part 15 in the border eliminating part 9 of FIG. 1.

FIG. 9 is a flowchart illustrating a second common area extraction process of the common area extraction part 15. When the second common area extraction process is used, a storage region for storing the sum of the first derivatives of the pixel values of all of the pixels of an image, is provided in the common area information buffer 16 for example. After an image of at least one page of a publication has been stored in the post-justification image buffer 14, the procedure advances from Step B0 to Step B1.

In Step B1, the common area extraction part 15 retrieves the post-justification image of a page from the post-justification image buffer 14. In Step B2, the common area extraction part 15 calculates the first derivative of the pixel values of all the pixels of the retrieved image. For calculating the first derivative, a Sobel filter, for example, can be used. In Step B3, the common area extraction part 15 determines the sum of the first derivatives of the pixel values of all the pixels of the retrieved image.

In Step B4, the common area extraction part 15 compares the sum of the first derivative of the pixel values of all the pixels of the retrieved image with the sum of first derivatives stored in the storage region. If Steps B1 to B6 are being performed for the first time, then the procedure advances to Step B5, regardless of the results of Step B4, and the sum of the first derivative of the pixel values of all the pixels of the retrieved image is stored in the storage region for storing the sum of the first derivatives. From the second time on that Steps B1 to B6 are performed, if the sum of the first derivatives of the retrieved image is greater than the sum of the first derivatives in the storage region, that is, only if the sum of the first derivatives of the retrieved image is the largest up to that point, then Step B4 proceeds to Step B5, and the sum of the first derivatives of the pixel values of all the pixels of the retrieved image is stored in the storage region for storing that sum. If the sum of the first derivatives of the retrieved image is less than the sum of the first derivatives stored in the storage region, then the sum is not stored, and the procedure advances from Step B4 to Step B6.

In Step B6, the common area extraction part 15 determines whether the sum of the first derivatives of the post-justification images of all the pages of the publication has been calculated. When there are still post-justification images for which the sum of the first derivatives has not yet been calculated, the procedure returns from Step B6 to Step B1, and Steps B1 to B5 are executed for the post-justification images for which the sum of the first derivatives has not yet been calculated. If the sum of the first derivatives of the post-justification images of all of the pages has been calculated, then the procedure advances from Step B6 to Step B7.

In Step B7, the common area extraction part 15 selects one of the post-justification images, whose first derivative sum has been stored in the storage region for storing that sum, as the standard image for border elimination, and extracts the common area within the selected image by image processing. The image processing for extracting the common area within the selected image is equivalent to the process in the justification process of the justification part 12 for extracting the page content region from the image of a page. That is, first, the page region is extracted from the selected image, the rectangular region surrounded by the outer tangents of the outermost characters within the extracted page region is extracted, and the extracted rectangular region is used as the common area.

In Step B8, the common area extraction part 15 stores the information defining the shape and position of the extracted common area in the common area information buffer 16 as the information which defines the common area within the post-justification images of all of the pages. After the common area information has been stored, the procedure of this flowchart ends at Step B9. The result is that if the images of the pages and the standard image for border elimination are superimposed on one another such that between the page images and the standard image for border elimination the coordinate system origin matches and the coordinate axes become parallel, then the region of overlap between the common area of the standard image and the images of the pages becomes the common area within the post-justification images of the pages.

As explained above, the common area extraction part 15 uses the common area in the image selected from all the images to extract the common area of the remaining images. In this second common area extraction process, it is sufficient to extract only the common area of a single selected image by image processing, and image processing does not have to be performed to extract the common area of the remaining images, so the border eliminating part 9 can quickly erase the outer borders within the images. Furthermore, when the common area of the single selected image is extracted by image processing, the border eliminating part 9 can accurately eliminate the outer borders within the images.

In the second common area extraction process of FIG. 9, a Sobel filter is used for calculating the first derivative of the pixel value of the pixels. The method for calculating the first derivative is however not limited to calculation methods using a Sobel filter, and it is also possible to use other methods for calculating first derivatives. In the second common area extraction process of FIG. 9, it is also possible to use other numerical values in place of the sum of the first derivatives, as long as they are indicators for comparing the relationship between large and small edge amounts within the images.

FIG. 10 is a flowchart illustrating the process of the background color calculation part 17 for calculating the background color of an image. In the example of FIG. 10, the common area information is made up of the coordinates (L, U) and (R,D) of those two vertexes serving as the two ends of a single diagonal line, from among the four vertexes of the rectangle making up the common area. It should be noted that in FIG. 5, the coordinate axis parallel to a horizontal direction on the paper plane is the x coordinate axis, and the coordinate axis parallel to a vertical direction on the paper plane is the y coordinate axis. In the example of FIG. 10, m samples are taken near the two sides of the common area 54 that are parallel to the x coordinate axis, and n samples are taken near the two sides of the common area 54 that are parallel to the y coordinate axis. It should be noted that in the example of FIG. 10, a single sample is the pixel value of a single pixel, and the pixels taken as samples are referred to as "sample points."

After the common area information is stored in the common area information buffer 16, the procedure advances from Step C0 to Step C1. In Step C1, the background color calculation part 17 retrieves the post-justification image 52 of the desired page from the post-justification image buffer 14. In Step C1, the background color calculation part 17 reads out the common area information, that is, the two vertex coordinates (L,U) and (R,D) on the diagonal of the common area 54, from the common area information buffer 16. In Step C3, the background color calculation part 17 calculates the horizontal spacing shown in equation 1 based on the common area information of (L,U) and (R, D). The horizontal spacing is the spacing between two adjacent sample points lined up parallel to the x coordinate axis. In Step C4, the background color calculation part 17 calculates the vertical spacing t shown in equation 2 based on the common area information of (L,U) and (R,D). The vertical spacing t is the spacing between two adjacent sample points lined up parallel to the y coordinate axis.

Equations 1

$$s = \frac{R-L}{m+2} \quad (1)$$

$$t = \frac{D-U}{n+2} \quad (2)$$

In Step C5, the background color calculation part 17 calculates the four endpoint coordinates (x0, y0), (xm, y0), (x0, yn), and (xm, yn) of all sample points based on the common area information of (L, U) (R, D), the horizontal spacing s, and the vertical spacing t. Equations 3 to 6 define x0, xm, y0, and yn. In Step C6, the background color calculation part 17 obtains, as samples, the pixel values of the four corners from the image that was read out in Step C1.

$$x0=L+s \quad (3)$$

$$xm=R-s \quad (4)$$

$$y0=U+s \quad (5)$$

$$yn=D-s \quad (6)$$

In Steps C7 to C11, the background color calculation part 17 calculates, as samples, the pixel values of the remaining sample points (x, y0) between the upper left corner (x0,y0) and the upper right corner (xm, y0), and the pixel values of the remaining points (x,ym) between the bottom left corner (x0,yn) and the bottom right corner (xm, yn), from the image that was read out in Step C1. The x coordinate "x" of the remaining sample points is the value at intervals of horizontal spacing s within the range shown in equation 7.

$$x0+s \leq x \leq xm-s \quad (7)$$

More specifically, in Step C7, the sum L+s of the x coordinate L of the upper left vertex (L,U) of the common area and the horizontal spacings, is substituted as the initial value for the x coordinate x of the remaining sample points. In Step C8, the pixel value of a remaining upper sample point (x,y0), as defined by the x coordinate x of the current point, is obtained as a sample. In Step C9, the pixel value of a remaining lower sample point (x, yn), as defined by the x coordinate x of the current point, is obtained as a sample. In Step C10, the horizontal spacing s is added to the x coordinate x of the current point to update the x coordinate x. In Step C11, it is determined whether the updated x coordinate x is less than the x coordinate R of the bottom right corner (R,D) of the common area. If the updated x coordinate x is less than the x coordinate R of the right edge of the common area, then the procedure returns from Step C11 to Step C8. If the updated x coordinate x is equal to or greater than the x coordinate R of the right edge of the common area, then the procedure advances from Step C11 to Step C12.

In Steps C12 to C16, the background color calculation part 17 calculates, as samples, the pixel values of the remaining sample points (x0, y) between the upper left corner (x0,y0) and the bottom left corner (x0, yn), and the pixel values of the remaining points (xm,y) between the upper right corner (xm,y0) and the bottom right corner (xm,yn). The y coordinate "y" of the remaining points is the value at intervals of vertical spacing t within the range shown in equation 8.

$$y0+t \leq y \leq yn-t \quad (8)$$

More specifically, in Step C12, the sum U+t of the y coordinate U of the upper left vertex (L,U) of the common area and the vertical spacing t is substituted as the initial value for the y coordinate y of the remaining sample points. In Step C13, the pixel value of a remaining left-side sample point (x0,y), as defined by the y coordinate y of the current point, is obtained as a sample. In Step C14, the pixel value of a remaining right-side sample point (xm, y), as defined by the y coordinate y of the current point, is obtained as a sample. In Step C15, the vertical spacing t is added to the y coordinate y of the current point to update the y coordinate y. In Step C16, it is determined whether the updated y coordinate y is less than the y coordinate D of the bottom right vertex (R,D) of the common area. If the updated y coordinate y is less than the y coordinate D of the bottom edge of the common area, then the procedure returns from Step C16 to Step C13. If the updated y coordinate y is equal to or greater than the y coordinate D of the right edge of the common area, then the procedure advances from Step C16 to Step C17.

In Step C17, the background color calculation part 17 calculates the most frequent value from all the samples obtained in Steps C6, C8, C9, C13, and C14. The calculated most frequent value of the samples is stored in the background color buffer 18 as information which indicates the background color of the image. After the most frequent value has been calculated, the procedure of the flowchart ends in Step C18.

In the example of FIG. 10 there is a fixed number of sample points, and the spacing between the sample points is calculated based on the number of sample points and the size of the common area such that the sample points are arranged at equal spacing. The sample points are not limited to an arrangement with equal spacing based on the number of sample points and the size of the common area, and different arrangements are possible. For example, it is possible that the vertical spacing s and the horizontal spacing t are always specific values, regardless of the number of sample points. The spacing of the sample points is not limited to an equal spacing or fixed spacing, and can be different for each sample point. In the example of FIG. 10, a sample is the pixel value of a single pixel. When the average value of the pixel values of all the pixels within the sample region is to be taken as the sample, the background color calculation part 17 sets, in Steps C6, C8,C9, C13, and C14, a sample region of a predetermined size including the sample points, obtains the pixel values of all the pixels within the sample region from the image that is read out in Step C1, calculates the average value of the obtained pixel values of all the pixels, and then the average value as taken as the sample.

In the explanations of FIGS. 1 to 10, the common area extraction part 15 processes the images of all the pages of a paper publication. It is, however, also possible that the common area extraction part 15 independently performs the extraction of the common area of the images of all right-side pages and the extraction of the common area of the images of all left-side pages of the images of the paper publication. It is also possible that the image input part 3 independently captures the images of all right-side pages and the images of all left-side pages of the paper publication. It is also possible that the justification part 12 independently justifies the images of all right-side pages and the images of all left-side pages of a paper publication. This could be done for the following reasons.

In paper publications, the right-side pages that open to the right when the publication is opened, and the left-side pages that open to the left, have a slightly different configuration of text and drawings, for example. Moreover, in paper publications, the left-side pages and the right-side pages are printed on the front and back of a single piece of paper. Thus, by processing the left-side pages and the right-side pages separately from one another, it is possible to take advantage of the above-mentioned characteristics of paper publications.

When the image input part 3 captures the images of all of the pages of a paper publication in page order from the front of the publication or in reverse page order from the back of the publication, an automatic document feeder that handles both sides becomes necessary because a left-side page and a right-side page are printed on the front and back of a single sheet of paper. If the image input part 3 individually processes the left-side pages and the right-side pages, then, if it is to capture only the left-side pages or the right-side pages in page order from the front of the publication or in reverse page order from the back of the publication, an automatic document feeder that does not handle both sides can be used. Consequently, the image input part 3 can be provided with an automatic document feeder of a simpler configuration, and thus the configuration of the image input part 3 can be simplified. It should be noted that the order for taking in the left-side pages and the order for taking in the right-side pages can be the same, or can be different.

The common area extraction part 15 preferably extracts the common area of the image of a left-side page and the image of a right-side page separately. The process for extracting the common area can be either the process of FIG. 8 or FIG. 9, or can be another method. When the common area of the images of the left-side page and the images of the right-side page is extracted individually, mistakes in extracting the common area, caused by differences in the configuration of the left-side pages and the right-side pages, can be eliminated.

It is preferable that the justification part 12, when independently justifying the images of the right pages and the images of the left pages, performs the justification such that the position of the page content region in the post-justification image of the right-side pages is substantially equivalent to the position of the page content region of the post-justification image of the left-side pages. The following is a detailed description of the process steps of this justification process.

The justification part 12 first selects an image serving as the standard for justifying the left page images from among all the left page images of all the images in the pre-justification buffer. Likewise, the justification part 12 selects an image serving as the standard for justifying the images of the right-side pages from among all the right page images of all the images in the pre-justification buffer. The process for selecting the standard justification image is the same as the process for selecting the standard image for border elimination in the above-described second common area extraction process. Thus, the image having the largest number of edges among all the left page images is selected for the standard image for the left-side pages, and the image having the largest number of edges among all the right page images is selected as the standard image for the right-side pages.

Next, the justification part 12 extracts the common area from the selected standard image for the left-side pages, and extracts the body content region from the selected standard image for the right-side pages. The process for extracting the body content region is the same as the process for extracting the page content region from a standard image in the above-described justification process. Then, the justification part 12 justifies the position of the body content region in the standard image for the left-side pages and the position of the body content region in the standard image for the right-side pages. Next, the justification part 12, based on the result of this justification, corrects the position of the body content region within the standard images by coordinate transformation, so as to align the position of the body content region with respect to the coordinate system origin in the standard image for the left-side pages and the position of the body content region with respect to the coordinate system origin in the standard image for the right-side pages. The reason for aligning the position of the body content region in the standard image for the left-side pages with the standard image for the right-side pages is because regardless of right or left page, it can be expected that the configurations of the body content regions on left and right-side pages are similar.

The justification part 12 then extracts the common area in the standard image for the corrected left-side pages. Then, using the position of the extracted common area with respect to the coordinate system origin as the template for the left-side page images, the justification part 12 subjects the images of the left-side pages to a coordinate transformation such that the position of the common area becomes that defined by the template, and creates post-justification images. Similarly, the justification part 12 extracts the common area in the standard image for the corrected right-side pages, and using the position of the common area extracted with respect to the coordinate system origin as the template for the images of the right-side pages, the justification part 12 subjects the images of the right-side pages to a coordinate transformation such that the position of the common area is that defined by the template, and creates post-justification images. By aligning the images of the left-side pages and the images of the right-side pages with the standard image for the corrected left-side pages and the standard image for the corrected right-side pages, post-justification images can absorb the differences in the configuration of the left-side pages and the configuration of the right-side pages.

It is preferable that the common area extraction part 15 collectively extracts the common area of the right and left-side page images when the differences in the configuration of the left-side pages and the layout of the right-side pages are absorbed by the post-justification images. Thus, it is possible to prevent a lateral displacement of the common area, which can occur when the common areas of the left and right-side pages are extracted separately.

The authoring device of the present embodiment is an example of the authoring device according to the invention, but a variety of other embodiments are possible as long as the principal configuration and operations are equivalent. In particular, if the detailed configuration and operation of the components of the authoring device can obtain the same effects, then the authoring device is not limited to the above-described configuration and operations, and can also be embodied by other configurations and operations. For example, instead of using the post-justification images of the pages of a publication, the common area extraction part 15, the background color calculation part 17, and the non common-area replacement part 19 can use the pre-justification images of the pages of the publication stored in the pre-justification image buffer 11, or the pre-correction images of the pages of the publication stored in the input image buffer 7.

In the present embodiment, the image correction part 8, the justification part 12, the common area extraction part 15, the background color calculation part 17, the non common-area replacement part 19, and the image input part 5 are each automatically activated one after the other in that order. However, it is also possible that an operator manually carries out the processing of the common area extraction part 15, the background color calculation part 17, and the non common-area replacement part 19. As long as processing is not impeded, it is also possible to omit the input image buffer 7, the pre-justification image buffer 11, the position information buffer 13, the post-justification image buffer 14, the common area information buffer 16, the background color buffer 18, and the output image buffer 20 as suitable. Furthermore, the border eliminating part 9 in the authoring device 1 can be independently used by itself as a border eliminating device.

It is also possible to realize the border eliminating part 9 by installing software, for executing the above-described operations related to border elimination with a computer, on a computer capable of inputting and storing images and by operating the central calculation process circuit with this software. The software is stored on a computer-readable storage medium, and is installed by inserting that storage medium into a storage medium reading device in the computer to read out the software. The storage medium can be an optical storage medium like a CD-ROM, a magnetic storage medium as typified by a floppy disk, or a magneto-optical storage medium as typified by a MO, for example.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

EFFECT OF THE INVENTION

As seen from the above, the border eliminating device according to the invention includes common area extraction means for extracting a common area from images of a plurality of pages of a publication, the common area being portions similar in layout of the images; and border removal means for removing borders outside the common area of the images. Thus, the border eliminating device can efficiently remove unnecessary outer borders from a plurality of images. Moreover, using the common area, the border eliminating device according to the invention performs a border eliminating process on images which have been aligned with respect to one another. Consequently, the border eliminating device can remove outer borders without shifting, among the plurality of images, the location of the portion subjected to border elimination within each image.

According to the invention, the common area extraction means extracts the common area from the overlap of all of the images before and after justification. Thus, the border eliminating device can more rapidly remove the outer border in the images. According to the invention, the common area extraction means also extracts the common area of remaining images based on the position and shape of the common area in a standard image that is selected from all of the images. Thus, the border eliminating device can quickly remove the outer border in the images. According to the invention, the common area extraction means uses the image having the largest number of edges of all the images being processed as the standard for eliminating borders. Thus, the common area extraction means can more reliably extract the common area of the standard image. According to the invention, the common area extraction means separately extracts the common area of the images of the right-side pages of a publication and the images of the left-side pages of a publication, for all of the images to be processed. Thus, the border elimination device can more accurately erase borders when the configuration of the right-side pages and the configuration of the left-side pages are different.

According to the invention, the border removal means replaces the color of the portion outside the common area with the background color of the common area. Thus, the border eliminating device can erase the outer border naturally, in accordance with the background color of the common area. According to the invention, the border eliminating device further includes background color calculation means for detecting background colors based on a sample extracted from the peripheral portion within the contour of the common area of the images. Thus, the border eliminating device can more rapidly remove outer borders within the images. According to the invention, the background color calculation means uses as the sample the pixel value of pixels in the peripheral portion within the contour of the common area of the images. Thus, the border eliminating device can more rapidly remove outer borders within the images. According to the invention, the background color calculation means uses as the sample the average value of the pixel value of all of the pixels included in a region of a specific size provided at the peripheral portion within the contour of the common area of the images. Thus, when the background of an image has a periodic pattern, the border eliminating device can more naturally remove the outer border in the image.

In the method for eliminating borders according to the invention as described above, a common area common to all the images being processed is used to remove the outer border within the images. Thus, when the border eliminating method is used, unnecessary outer borders are efficiently removed from a plurality of images.

Furthermore, according to the invention as described above, the authoring device uses a border eliminating device with the above-described configuration to remove all the outer borders in the images of the pages of a publication. Thus, the authoring device can efficiently and quickly remove outer borders in the images of all pages when creating the image-based contents of an electronic publication based on a publication using a paper medium.

The invention claimed is:

1. A border eliminating device comprising:
   common area extraction means for extracting from images of a plurality of pages of a publication an area common to the images, the common area being portions similar in layout of the images; and
   border removal means for removing borders outside the common area of the images,
   wherein layouts with respect to at least either text or drawings in the common area of the images are similar to each other.

2. The border eliminating device of claim 1, further comprising:
   justification means for justifying images so that the common area in the images is arranged at a predetermined position within the images,
   wherein the common area extraction means and the border removal means perform processes with respect to all post-justification images.

3. The border eliminating device of claim 1, further comprising:
   justification means for justifying images so that the common area in the images is arranged at a predetermined position within the images, wherein the common area extraction means:
   (a) for each page of a publication, determines from justified images a region in which there is overlap between a post-justification image and a pre-justification image when they are superimposed on one another such that a coordinate system origin is shifted for an amount of displacement when they are aligned, and coordinate axes of both images become parallel; and
   (b) extracts as the common area an overlapping portion in the region of the images, when all post-justification images are overlapped with their coordinate systems matching one another.

4. The border eliminating device of claim 1, wherein the common area extraction means:
   (a) selects from all the images an image to be a standard for eliminating borders;
   (b) extracts a common area from the selected image; and
   (c) extracts from the remaining images a region that is at the same position as the position of the common area of the selected image and that is congruent with the common area of the selected image, as a common area of the remaining images.

5. The border eliminating device of claim 4, wherein the common area extraction means selects from all the images an image having a largest number of edges as an image serving as a standard for border elimination.

6. The border eliminating device of claim 1, wherein the common area extraction means independently performs the extraction of a common area of images of all right-side pages of a publication and the extraction of a common area of images of all left-side pages of the publication.

7. The border eliminating device of claim 1, further comprising:
   background color calculation means for determining a background color of the common area of the images,
   wherein the border removal means replaces a color of a portion outside the common area of the images with the detected background color.

8. The border eliminating device of claim 7, wherein the background color calculation means:
   (a) extracts a plurality of samples from a peripheral portion inside the common area of the images; and
   (b) sets a color of a most frequent value among the plurality of extracted samples as the background color.

9. The border eliminating device of claim 8, wherein the samples are pixel values of pixels in the peripheral portion inside the common area of the images.

10. The border eliminating device of claim 8, wherein the samples are average values of the pixel values of all pixels included in regions of a predetermined size provided in the peripheral portion inside the common area of the images.

11. A border eliminating method, comprising:
    a step of providing common area extraction means for extracting from images of plurality of pages of a publication an area common to the images, the common area being portions similar in layout of the images;
    a step of extracting from the images of a plurality of pages of a publication an area common to the images, the common area being portions similar in layout of the images, with the common area extraction means;
    a step of providing border removal means for removing borders outside the common area of the images; and
    a step of removing borders outside the common area of the image from each image with the border removal means;
    wherein layouts with respect to at least either text or drawings in the common area of the images are similar to each other.

12. An authoring device, comprising:
    image input means for inputting images of pages of a publication;
    the border eliminating device of any one of claims 1 to 10; and
    image output means for outputting images of pages processed by the border eliminating device.

* * * * *